United States Patent
Iwasaki

(10) Patent No.: US 6,497,972 B1
(45) Date of Patent: Dec. 24, 2002

(54) FUEL CELL SYSTEM AND METHOD FOR CONTROLLING OPERATING PRESSURE THEREOF

(75) Inventor: Yasukazu Iwasaki, Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 161 days.

(21) Appl. No.: 09/612,375

(22) Filed: Jul. 7, 2000

(30) Foreign Application Priority Data

Jul. 9, 1999 (JP) .......................................... 11-196058

(51) Int. Cl.[7] .............................................. H01M 8/04
(52) U.S. Cl. .............................. 429/13; 429/22; 429/25
(58) Field of Search ............................. 429/12, 13, 22, 429/23, 24, 25

(56) References Cited

U.S. PATENT DOCUMENTS

| | | | | |
|---|---|---|---|---|
| 4,738,903 A | * | 4/1988 | Garow et al. .................. | 429/17 |
| 4,820,594 A | * | 4/1989 | Sugita et al. .................. | 429/17 |
| 5,200,278 A | * | 4/1993 | Watkins et al. ................ | 429/24 |
| 5,401,589 A | * | 3/1995 | Palmer et al. ................. | 429/13 |
| 5,605,770 A | * | 2/1997 | Andreoli et al. .............. | 429/20 |
| 6,015,634 A | * | 1/2000 | Bonville, Jr. et al. ......... | 429/17 |
| 6,110,615 A | * | 8/2000 | Bloomfield ................... | 429/21 |
| 6,171,718 B1 | * | 1/2001 | Murach et al. ................ | 429/13 |
| 6,312,842 B1 | * | 11/2001 | Reiser et al. .................. | 429/13 |

FOREIGN PATENT DOCUMENTS

| | | |
|---|---|---|
| JP | 5-47400 | 2/1993 |
| JP | 11-288731 | 10/1999 |
| JP | 2000-67895 | 3/2000 |

* cited by examiner

Primary Examiner—Stephen Kalafut
Assistant Examiner—M. Wills
(74) Attorney, Agent, or Firm—Foley & Lardner

(57) ABSTRACT

A fuel cell system is provided with a water tank, a reformer obtaining reformed gas by reforming a fuel using water from the water tank, and a condenser reclaiming water from the exhaust gas from the condenser and return the water to the water tank. A method for controlling operating pressure is applied to such a fuel cell system. Here, in response to the exhaust temperature of the condenser, the equillibrium operating pressure of the fuel cell system at which the water inflow and outflow in the fuel cell system are balanced is calculated, and the maximum efficiency operating pressure at which the operating efficiency of the fuel cell system is maximum is calculated. Control is performed of the operating pressure of the fuel cell system so that it is the higher pressure of the equillibrium operating pressure and the maximum efficiency operating pressure.

18 Claims, 7 Drawing Sheets

FUEL CELL SYSTEM AND METHOD FOR CONTROLLING OPERATING PRESSURE THEREOF

BACKGROUND OF THE INVENTION

The present invention relates to a fuel cell system and a method for controlling operating pressure of a fuel cell system, and more particularly to a fuel cell system in which water can be preferably reclaimed and accumulated from exhaust gas emitted from a fuel cell and a method for controlling the operating pressure thereof.

According to an investigation by the inventor of the present invention, a configuration mounted in a fuel cell vehicle 101 shown in FIG. 9 is one configuration of fuel cell system.

In the fuel cell system SS of the fuel cell vehicle 101, methanol 17, which is used as a fuel, is steam reformed by a reformer 13 using water 21, thereby generating a reformed gas 23 that includes hydrogen, this being fed to the anode side of the fuel cell 29.

Air 27 from a compressor 25 is sent to the cathode side of the fuel cell 29.

In the fuel cell 29, the hydrogen contained in the reformed gas 23 and the oxygen contained in the air 27 are used to generate electric power.

The hydrogen contained in the reformed gas 23 and the oxygen contained in the air 27 are not completely consumed within the fuel cell 29, a part that is not consumed being sent to a combustor 37, via a condenser 35, as exhaust reformed gas 31 and exhaust air 33.

In the combustor 37, the exhaust reformed gas 31 and the exhaust air 33 are combusted, together with the air 39 from the compressor 25 and the methanol from a methanol tank 15, the heat of the combustion reaction thereof being re-used as a source of heat for vaporizing methanol 17 and water 21 in the reformer 13.

In a system controller 57, based on the pressures of the air and reformed gas detected by pressure sensors 59 and 61 provided upstream from the fuel cell 29, the opening of the pressure adjustment valves 63 and 65 provided downstream of the condenser 35 is adjusted, thereby controlling the operating pressure of the fuel cell SS, this being the operating pressure of the fuel cell 29. When the operating load on the fuel cell system SS is large, control is performed so that this operating pressure is increased so as to achieve the maximum electric power from the fuel cell system SS. When the operating load is small, however, control is performed so that the operating pressure is reduced, so as to increase the efficiency of the fuel cell system.

At the condenser 35, cooling water W is used to cool exhaust reformed gas 31 and exhaust air 33 exhausted from the fuel cell 29, the steam included in the exhaust reformed gas 31 and exhaust air 33 being condensed and reclaimed, the reclaimed water 43 being then returned to a water tank.

In FIG. 9, the bold solid line EL indicates the electric power line, and the EXT indicates the exhaust gas from the combustor 37.

In some cases, air A from the compressor 25 is sent to the reformer 13.

SUMMARY OF THE INVENTION

In the above-noted fuel cell system SS, however, the system controller 57, based on the pressures of the air and the reformed gas detected by the pressure sensors 59 and 61. provided upstream of the fuel cell 29, adjusts the openings of the pressure adjustment valves 63 and 65 provided downstream of the condenser 35 so as to control the operating pressure of the fuel cell 29.

For this reason, the reclamation of water by the condenser 35 is dependent upon the operating condition of the system controller 57.

Thus, depending upon the operating condition of the system controller 57, it can be envisioned that there occurs a reduction in the amount of water reclaimed into the water tank 19 from the condenser 35.

Given the above, in order to prevent water in the water tank 19 from running dry, one method that can be envisioned is that of increasing the capacity thereof. However, this is not desirable from the standpoint of layout for installing the fuel cell system SS in a vehicle.

With the fuel cell system SS, because it is necessary to replenish the water tank 19 with water before it runs dry of water, which can happen while the vehicle is being operated, for example, this being undesirable.

Accordingly, the present invention was made in consideration of the above-noted investigation, and has as an object to provide a fuel cell system and a method for controlling operating pressure thereof which substantially do not require replenishment of water used in the fuel cell system and which contributes to the improvement of the practicality thereof.

A fuel cell system according to the present invention comprises: a water tank; a reformer obtaining reformed gas by reforming fuel using water from the water tank; a fuel cell generating electric power using reformed gas from the reformer and gas that includes oxygen; a condenser reclaiming water from exhaust gas from the fuel cell, the exhaust gas reclaimed by the condenser being returned to the water tank; an exhaust gas temperature detector detecting temperature of exhaust gas from the condenser; and an operating pressure controller controlling the operating pressure of the fuel cell system. Here, the operating pressure controller, in response to the temperature of the exhaust gas from the condenser detected by the exhaust gas temperature detector, calculates equilibrium operating pressure of the fuel cell system at which inflow and outflow of the water within the fuel cell system is balanced, in response to operating load on the fuel cell system, calculates maximum efficiency operating pressure at which operating efficiency of the fuel cell system is maximum, and performs control of the operating pressure of the fuel cell system so as to achieve higher pressure of the equilibrium operating pressure and the maximum efficiency operating pressure.

In other words, a fuel cell system according to the present invention comprises: a water tank; a reformer obtaining reformed gas by reforming fuel using water from the water tank; a fuel cell generating electric power using reformed gas from the reformer and gas that includes oxygen; a condenser reclaiming water from exhaust gas from the fuel cell, the exhaust gas reclaimed by the condenser being returned to the water tank; an exhaust gas temperature detecting means for detecting temperature of exhaust gas from the condenser; and an operating pressure control means for controlling the operating pressure of the fuel cell system. Here, the operating pressure control means, in response to the temperature of the exhaust gas from the condenser detected by the exhaust gas temperature detecting means, calculates equilibrium operating pressure of the fuel cell system at which inflow and outflow of the water within the fuel cell system is balanced, in response to operating load on the fuel cell system, calculates maximum efficiency operating pressure at which operating efficiency of the fuel cell system is maximum, and performs control of the operating pressure of the fuel cell system so as to achieve higher pressure of the equilibrium operating pressure and the maximum efficiency operating pressure.

On the other hand, a method for controlling operating pressure of a fuel cell system according to the present invention is applied to a fuel cell system having a water tank, a reformer obtaining reformed gas by reforming a fuel using water from the water tank, a fuel cell generating electric power using reformed gas from the reformer and a gas that contains oxygen, and a condenser reclaming water from exhaust gas from the fuel cell and returning the water to the water tank. Here, the method detects temperature of exhaust gas from the condenser; calculates, in response to the temperature of the exhaust gas from the condenser, equillibrium operating pressure of the fuel cell at which inflow and outflow of the water within the fuel cell system is balanced; calculates operating load on the fuel cell system; calculates maximum efficiency operating pressure at which operating efficiency of the fuel cell system is maximum; and control the operating pressure of the fuel cell system so as to achieve higher pressure of the equillibrium operating pressure and the maximum efficiency operating pressure.

BRIEF DESCRIPTIONS OF THE DRAWING

DETAILED DESCRIPTION OF THE PREFERRED EMBODIMENTS

Embodiments of a fuel cell system and a method for controlling operating pressure thereof according to the present invention are describe in detail below, making reference to relevant accompanying drawings.

A first embodiment of a fuel cell system and an associated operating pressure control method therefor according to the present invention are described below, with references being made to FIG. 1 through FIG. 4.

Figure 1:
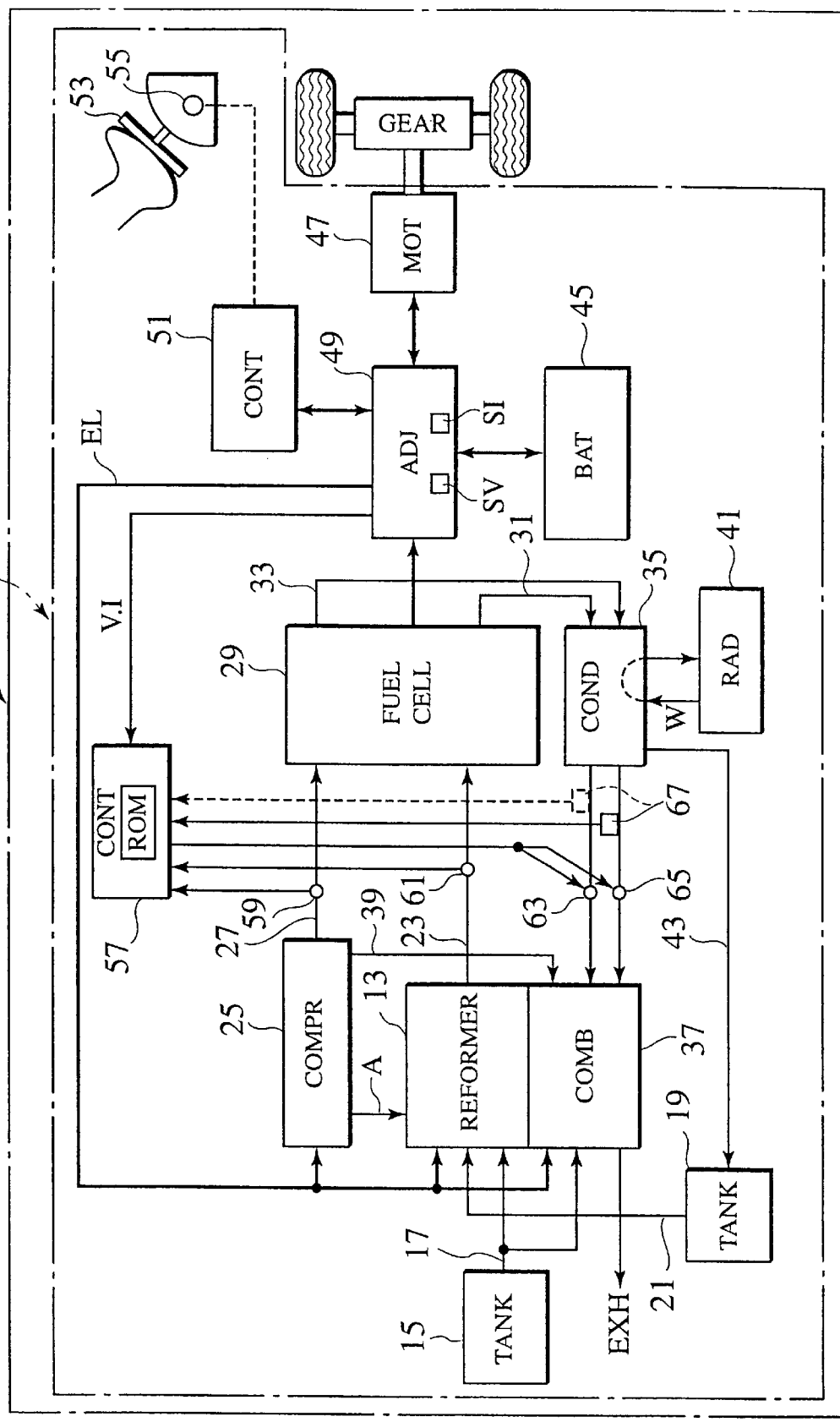
FIG. 1 is a drawing showing a fuel cell vehicle in which a fuel cell system according to a first embodiment of the present invention is mounted.

FIG. 1 shows a fuel cell vehicle 11 into which is installed a fuel cell system S1 according to an embodiment of the present invention.

In FIG. 1, a reformer 13 uses water supplied from a water tank 19 to steam reform methanol 17 fuel supplied from a methanol tank 15, reformed gas 23 that contains hydrogen being thereby generated. This steam reforming is an endothermic reaction.

In some cases, the reformer 13 uses air A supplied from the compressor 25 to partially oxidize methanol 17 supplied from the methanol tank 15, thereby generating reformed gas. This oxidation reforming is an exothermic reaction.

Reformed gas 23 supplied from the reformer 13 and air 27 supplied from the compressor 25 are fed to the anode side and cathode side, respectively, of the fuel cell 29, thereby generating electricity (i.e., electric power), using the hydrogen in the reformed gas 23 and the oxygen in the air 27.

The hydrogen in the reformed gas 23 and the oxygen in the air 27 are not completely consumed in the fuel cell 29, part thereof remaining and being exhausted. That is, the exhaust reformed gas 31 and the exhaust air 33 are sent to the combustor 37, via the condenser 35.

At the combustor 37, the exhaust reformed gas 31 and exhaust air 33 are combusted, along with the air 39 supplied from the compressor 25 and the methanol 17 supplied from the methanol tank 15.

The heat of the combustion reaction in the combustor 37 is re-used to vaporize the methanol 17 and water 21 in the reformer 13, and as a heat source for the endothermic reaction of steam reforming.

The condenser 35 uses cooling water W from a radiator 41 to cool, by heat exchanging, the exhaust reformed gas 31 and the exhaust air 33 respectively exhausted from the fuel cell 29, the steam contained therein being condensed and reclaimed, and returned to the water tank 19 as reclaimed water 43.

A battery 45 accumulates electric power generated by the fuel cell 29, and regeneratively generated electric power generated by a motor 47 when the vehicle decelerates.

An electric power adjuster 49, in response to a control signal from an electric power controller 51, in the case in which it is not possible for the electric power generated by the fuel cell 29 to supply sufficient electric power for consumption by the motor 47 in driving, and for consumption by auxiliary equipment (e.g., the compressor 25, the reformer 13, and the combustor 37), performs appropriate electric power distribution, such as supply of electric power to the motor 47 from the battery 45, and electric power to auxiliary equipment such as the compressor 25, to augment the insufficient electric power.

The electric power controller 51, based on a detection signal corresponding to the amount of accelerator pedal 53 depression detected by a position sensor 55, sends a control signal to the electric power adjuster 49, so as to appropriately distribute the electric power by means of the electric power adjuster 49.

Inside the electric power adjuster 49 are provided a voltage sensor SV and a current sensor SI that detect the voltage and the current generated by the fuel cell 29, the detection result therefrom being output to a system controller 57.

An air pressure sensor 59 detects the pressure of air 27 supplied to the fuel cell 29 from the compressor 25, the detected air pressure value being output to the system controller 57.

A reformed gas pressure sensor 61 detects the pressure of reformed gas supplied to the fuel cell 29 from the reformer 13, the detected reformed gas pressure value being output to the system controller 57.

An exhaust reformed gas pressure adjustment valve 63 adjusts the pressure of exhaust reformed gas sent to the combustor 37 from the condenser 35.

An exhaust air pressure adjustment valve 65 adjusts the pressure of exhaust air send to the combustor 37 from the condenser 35.

A temperature sensor 67 is disposed near the outlet of the condenser 35 and detects the outlet temperature of the exhaust air discharged from the condenser 35, this being sent to the system controller 57. The mounting position of the temperature sensor 67, in order to detect the temperature of the exhaust reformed gas of the condenser 35, can be in proximity to the exhaust reformed gas outlet (broken line in FIG. 1) of the condenser 35. In this embodiment, in order to detect the typical exhaust air outlet temperature, the mounting position is near the exhaust air outlet of the condenser 35 (solid line in FIG. 1).

The system controller 57 monitors the air pressure detected by the pressure sensor 59 and the reformed gas pressure value detected by the pressure sensor 61, and adjusts the opening of the pressure adjustment valves 63 and 65, so as to control the operating pressure of the fuel cell system, more specifically, to control the operating pressure of the fuel cell 29. The system controller 57, based on the voltage V and the current I detected by the voltage sensor SV and the current sensor SI inside the electric power adjuster 49, calculates the operating load on the fuel cell system S1. Additionally, the system controller 57 calculates, in response to the temperature T of the exhaust air exhausted from the condenser 35 and detected by the temperature sensor 67, the equilibrium operating pressure Pcnd of the fuel cell 29 at which the inlet and outlet of water within the fuel cell system S1 is balanced and, in response to the operating load on the fuel cell system S1, calculates the maximum efficiency operating pressure Plod at which the operating efficiency of the fuel cell system S1 is maximum, and further performs control of the operating pressure of the fuel cell 29 so as to achieve the higher pressure of the equilibrium operating pressure Pcnd and the maximum efficiency operating pressure Plod. The system controller 57 has within it a plurality of maps, described below, for the purpose of controlling the fuel cell system S1, these being stored in a control ROM beforehand.

Figure 2:
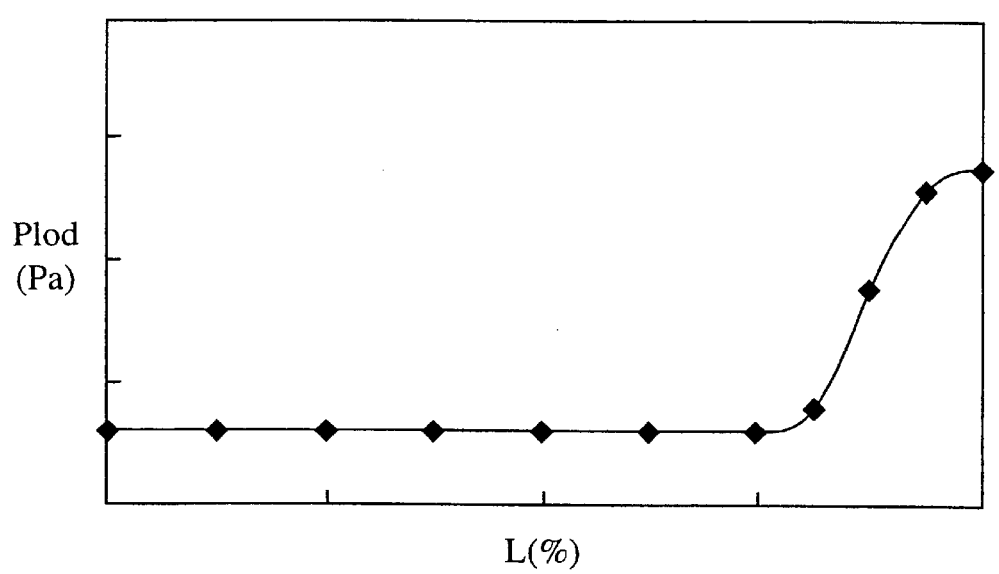
FIG. 2 is a drawing showing a map A for determining the maximum efficiency operating pressure Plod at which the system efficiency is maximum, in response to the operating load L on the fuel cell system according to the present embodiment.

The map A shown in FIG. 2 represents the maximum efficiency operating pressure Plod, at which the operating efficiency of the fuel cell 29 is maximum, in response to the operating load on the fuel cell system S1, this map being priorly stored in a ROM of the system controller 57.

More specifically, the system controller 57, in response to an operating load L on the fuel cell system S1, performs control of the fuel cell system S1 so as to achieve the maximum efficiency operating pressure Plod determined from map A, which represents the mutual relationship between the operating load L and the maximum efficiency operating pressure Plod, in response to the operating load on the fuel cell system S1. This maximum efficiency operating pressure Plod is established so that, in the case in which the operating load L is large, the operating pressure is made higher so as to achieve the maximum electric power from the fuel cell system S1, and in the case in which the operating load L is small, the operating pressure is made lower, so as to increase the efficiency of the fuel cell system S1 by maximizing the system efficiency of the fuel cell system S1 in response to the operating load L.

Figure 3:
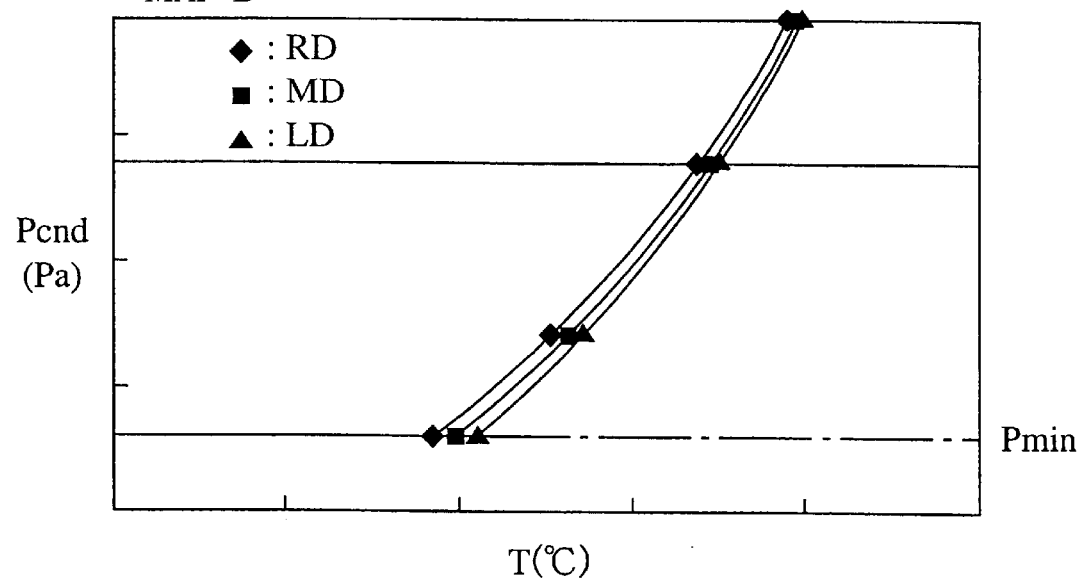
FIG. 3 is a map B representing the mutual relationship between the condenser outflow temperature T and the equilibrium operating pressure of the fuel cell system Pcnd, at which the inflow and outflow of water in the fuel cell system are balanced, according to the present embodiment.

Map B shown in FIG. 3 represents the mutual relationship between the outlet temperature T of the condenser 35, this specifically being the outlet temperature of the exhaust air therefrom, and the equilibrium operating pressure Pcnd of the fuel cell 29 at which the water inlet and outlet in the fuel cell system S1 are balanced, this map being priorly stored in a ROM in the system controller 57. The Pmin indicated in FIG. 3 is the lower limit value of pressure at which normal supply of reformed gas and air is possible. This is due to a pressure loss occurring, for example, in the combustor 37 and in piping.

More specifically, in order to continue operation by reclaiming water by the condenser 35 so that the water does not run dry in the fuel cell system S1, the operating pressure of the fuel cell 29, in response to the outlet temperature T of the condenser 35, can be set to a value greater than the equilibrium operating pressure Pcnd on line RD for rated operation, as indicated in FIG. 3.

In this case, if the setting is made to an operating pressure higher than the line RD for rated operation, water will be reclaimed by the condenser 35 and accumulated.

For the medium-load condition, the line MD for medium load operation can be used, and for low-load operating, the line LD for low-load operation can be used.

Figure 4:
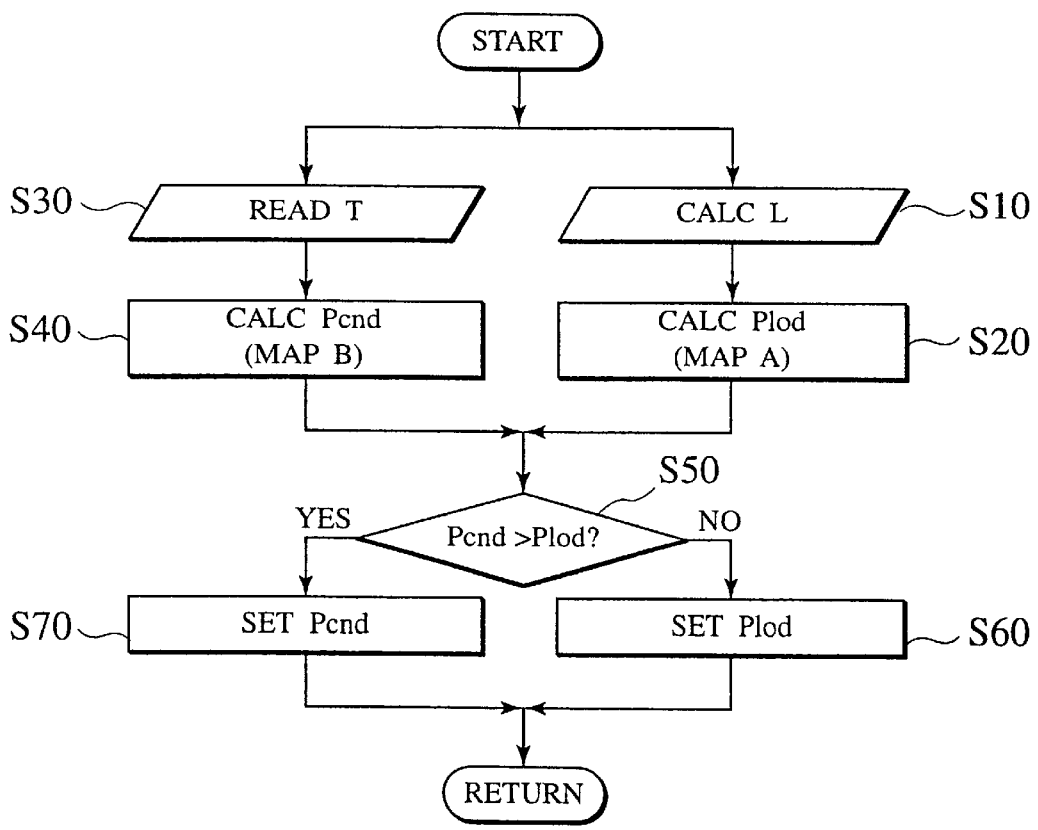
FIG. 4 is a flowchart illustrating the operation of the fuel cell system according to the present embodiment.

Next, the operating of a fuel cell system S1 according to this embodiment is described in detail below, following the flowchart of FIG. 4.

The control program represented by this flowchart is stored in an internal ROM of the system controller 57, which operates in accordance with this control program. The processing of this control program is started at a prescribed time interval, and multitask processing is done.

First, when the processing is begun, the system controller 57, at steps S10 and S30, executes parallel processing.

At step S10, based on the voltage V and the current I detected by the voltage sensor SV and the current sensor SI inside the electric power adjuster 49, the operating load L on the fuel cell system S1 is calculated.

Specifically, the operating load L% of the fuel cell system S1 is determined as follows from the electric power VI generated by the fuel cell 29 and the auxiliary equipment electric power Σvi.

$$L=\{(VI-\Sigma vi)/VI\}\times 100$$

The auxiliary equipment electric power Σvi can alternately be determined by providing a voltage sensor and a current sensor in each piece of auxiliary equipment, such as the compressor 25, and calculating the total value thereof. When electric power is being supplied to the motor 47 from the battery 4, the electric power consumption term due to the motor 45 is removed from the auxiliary equipment electric power Σvi.

Next, at the next step S20 after step S10, map A shown in FIG. 2 is referenced, and the maximum efficiency operating pressure Plod at which the system efficiency is maximum, in response to the operating load on the fuel cell system S1, is read therefrom.

Next, at the next step S30 after step S20, the outlet temperature T from the temperature sensor 67 mounted at the outlet of the condenser 35 is read in.

Next, at the next step S40 after step S30, map B shown in FIG. 3 is referenced, and the equilibrium operating pressure Pcnd corresponding to the outlet temperature T of the condenser 35 during operation is read.

At step S50 which follows steps S20 and S40, a comparison test is made as to whether or not the equilibrium operating pressure Pcnd is greater than the maximum efficiency operating pressure Plod is performed.

Specifically, if the equilibrium operating pressure Pcnd is lower (NO result), control flow proceeds to step S60, but if the equilibrium operating pressure Pcnd is higher (YES result), control flow proceeds to step S70.

If the program flow proceeded to step S60, the fuel cell system S1 operating pressure, that is, the operating pressure of the fuel cell 29 is set to the maximum efficiency operating pressure Plod.

More specifically, the pressure of air 27 supplied to the fuel cell 29 from the compressor 29 is monitored by the pressure sensor 59, and the opening of the pressure adjustment valve 65 is controlled so as to achieve an operating pressure of the air 27 detected by the pressure sensor 59 that is the maximum efficiency operating pressure Plod, and the pressure of the exhaust air sent to the combustor 37 from the condenser 35 is adjusted. Simultaneously, the pressure of the reformed gas 23 supplied to the opening of the pressure adjustment valve 63 is controlled so as to achieve an operating pressure of the reformed gas 23 detected by the pressure sensor 61 that is the maximum efficiency operating pressure Plod, and the pressure of the exhaust reformed gas sent to the combustor 37 from the condenser 35 is adjusted.

If the program flow proceeds to step S70, however, the operating pressure of the fuel cell system S1 is set to the equilibrium operating pressure Pcnd.

More specifically, the pressure of the air 27 supplied to the fuel cell 29 from the compressor 25 is monitored by the pressure sensor 59, and the opening of the of the pressure adjustment valve 65 is controlled so as to achieve an operating pressure of the air 27 detected by the pressure sensor 59 that is the equilibrium operating pressure Pcnd, and the pressure of the exhaust air sent to the combustor 37 from the condenser 35 is adjusted. Simultaneously, the pressure of the reformed gas 23 supplied to the fuel cell 29 from the reformer 13 is monitored by the pressure sensor 61, and the opening of the pressure adjustment valve 63 is controlled so as to achieve an operating pressure of the reformed gas 23 detected by the pressure sensor 61 that is the equilibrium operating pressure Pcnd, and the pressure of the exhaust reformed gas sent to the combustor 37 from the condenser 35 is adjusted.

After performing the processing of either step S60 or step S70 in the above-noted manner, return is made to the beginning of the processing.

According to the above-noted configuration, in this embodiment of the present invention because it is possible to reliably control the operating pressure of the fuel cell system so that it is above the equilibrium operating pressure, it is possible to reclaim water from the exhaust air in the condenser, which has exceeded the equilibrium operating pressure, and to accumulate the water in the water tank.

As a result, replenishment of the water in the tank becomes substantially unnecessary, and it is possible to use a small water tank, thereby improving the layout and contributing to the practical usefulness of the system.

Additionally, there is an improvement in starting characteristics at below the freezing point of water, making it possible to achieve a fuel cell system which requires only a small amount of energy to start at below the freezing point of water.

As described with regard to FIG. 3, with respect to the outlet temperature of the condenser 35, the equilibrium operating pressure Pcnd at which the inflow and outflow of water in the fuel cell system S1 is balanced exhibits some differences, depending on the operating load on the fuel cell system S1. For this reason, it is possible to set the equilibrium operating pressure Pcnd based not only on the outlet temperature T of the condenser 35, but also on the operating load on the fuel cell system S1. For example, in FIG. 3, the equilibrium operating pressure Pcnd is set as the RD, MD, and LD for rating operation, and operation at a medium and low load, respectively. By making these settings, in accordance with the operating load, in the case in which the outside air temperature is low and the water reclaiming capacity of the condenser 35 is high, because water is accumulated, the setting is made to give priority to system efficiency. However, in the case in the outside temperature is high, and the water reclaiming capacity of the condenser 35 is decreased, the setting is made so as to achieve water equilibrium, and also suppress a decrease in system efficiency as much as possible.

It is also possible, based appropriately on the outlet temperature T of the condenser 35 and the operating load L on the fuel cell system S1, to determine the equilibrium operating pressure Pcnd from a map corresponding to map A, and to determine the maximum efficiency operating pressure Pcond from a map corresponding to map B, these being then compared and the higher of the two being set.

A second embodiment of a fuel cell system and operating pressure control method therefor according to the present invention is described in detail below, with references being made to FIG. 5 through FIG. 8.

Figure 5:
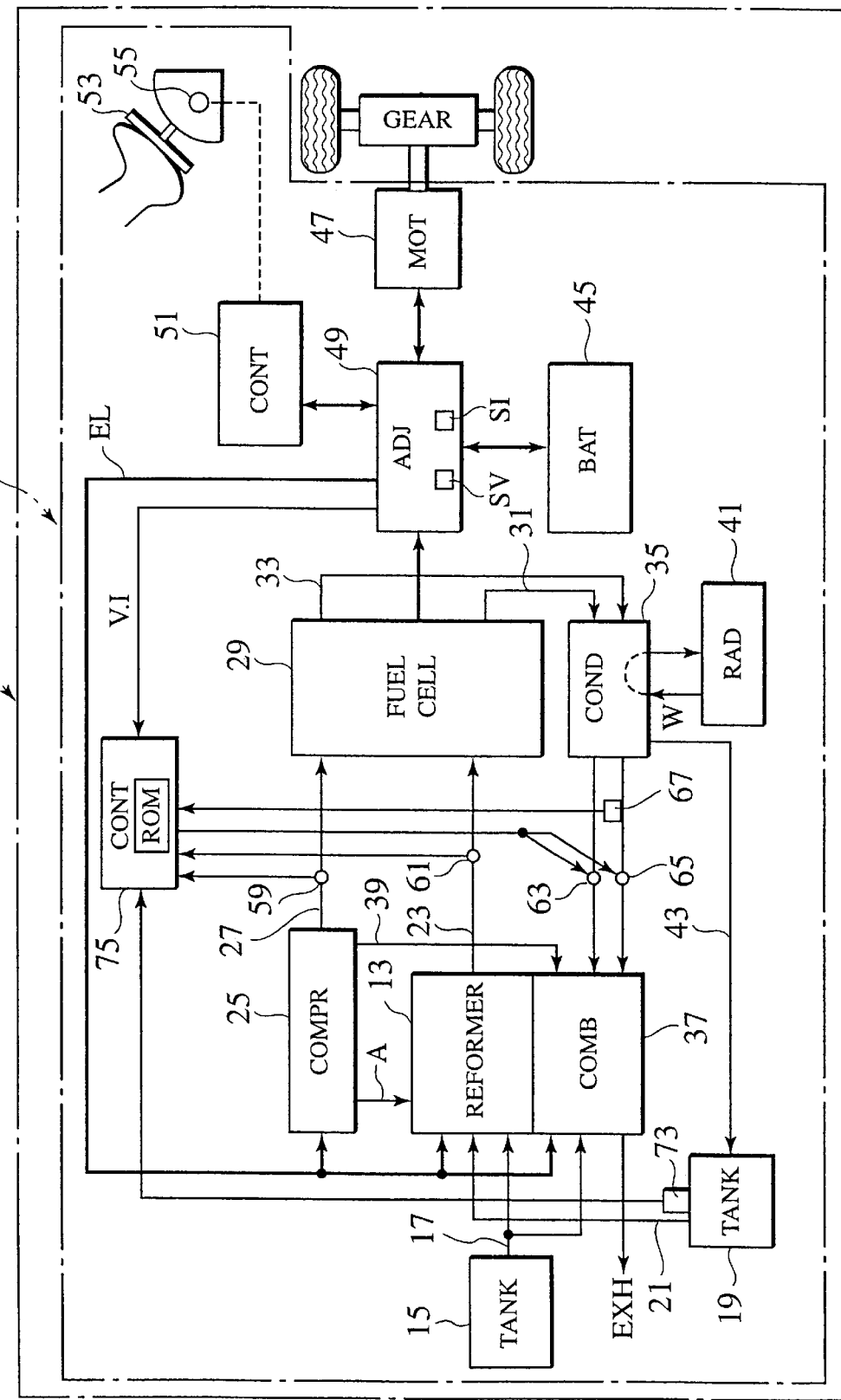
FIG. 5 is a drawing showing a fuel cell vehicle into which a fuel cell system according to a second embodiment of the present invention is mounted.

As can be seen from FIG. 5, in this embodiment of the present invention, the overall fuel cell system S2 configuration is similar to that which is shown in FIG. 1, with the difference that, in this embodiment, a water level sensor 73 has been added to the water tank 19.

Figure 6:
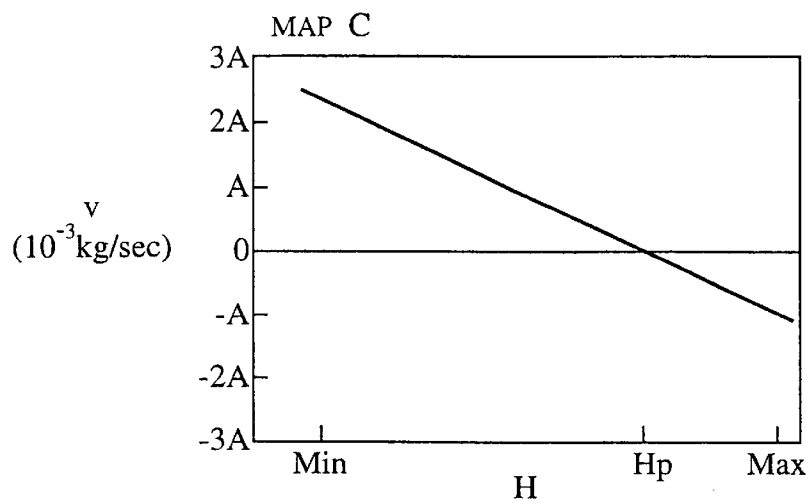
FIG. 6 is a map C for determining the water reclamation speed v from the water level difference until the water tank water level H is made optimum according to the present embodiment.
Figure 7:
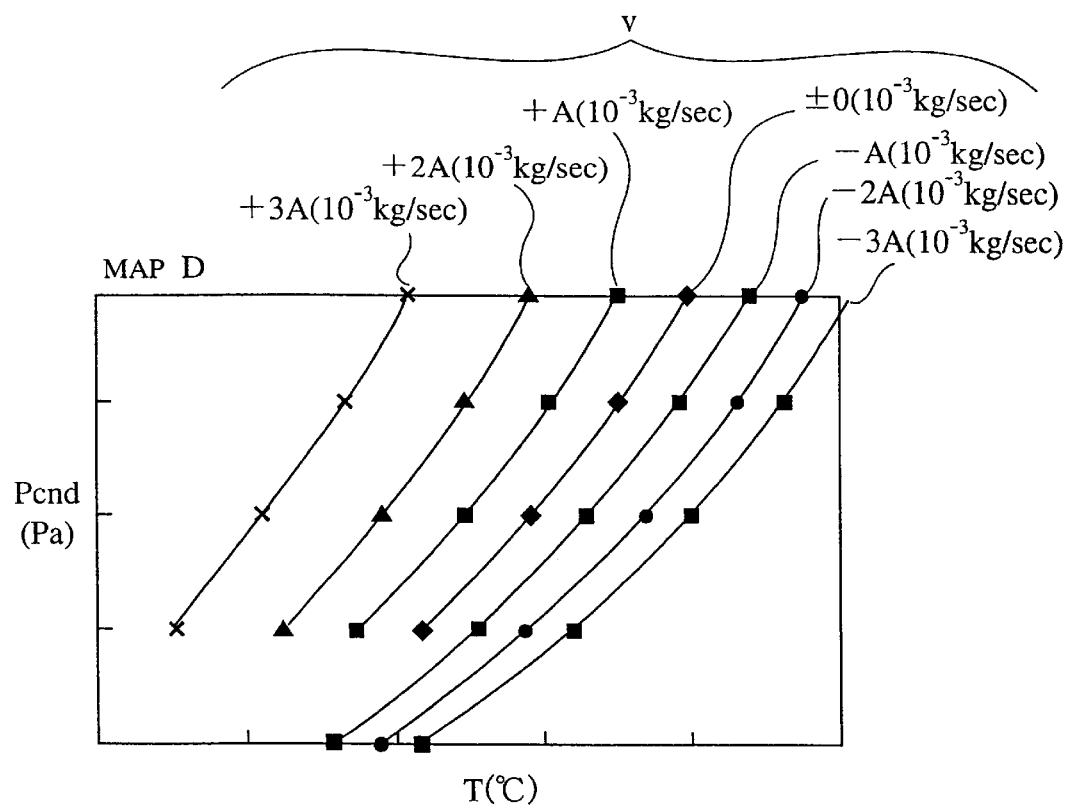
FIG. 7 is a map D representing the mutual relationship between the condenser outflow temperature T, the water reclamation speed v in the fuel cell system, and the fuel cell equilibrium operating pressure Pcnd according to the present embodiment.

The water level sensor 73 detects the water level within the water tank 19, and outputs the water level value H to the system controller 75, based on the water reclamation speed v established by the map C shown in FIG. 6 and the outlet temperature T of the condenser 35 that is measured separately, makes a comparison of the equilibrium operating pressure Pcnd established using the map D shown in FIG. 7 and the maximum efficiency operating pressure Plod established from map A of FIG. 2, as described with regard to the first embodiment, and sets the operating pressure of the fuel cell system S2.

The map C shown in FIG. 6 is a map used to determine the water reclamation speed by the water level difference from water level value H of the water tank 19 to the optimum value Hp. The ideal value Hp used herein corresponds to the condition in which there is neither excess nor insufficient water in the fuel cell system S2.

The map D shown in FIG. 7 represents the mutual relationship between the outlet temperature T of the condenser 35, the water reclamation speed v in the fuel cell system S2, and the equilibrium operating pressure Pcnd of the fuel cell. This map D is for rated operation.

More specifically, in map D, the water reclamation speed v line for $+-0(10^{-3}$ kg/second) corresponds to the condition balance between water inflow and outflow, this being the same as map B shown in FIG. 3. In the positive direction of water reclamation speed v, for example +A, water reclamation proceeds well and the amount of water in the water tank 19 tends to increase. In the negative direction of water reclamation speed v, however, the reclamation of water is not fast enough, so that the amount of water in the tank tends to decrease.

Figure 8:
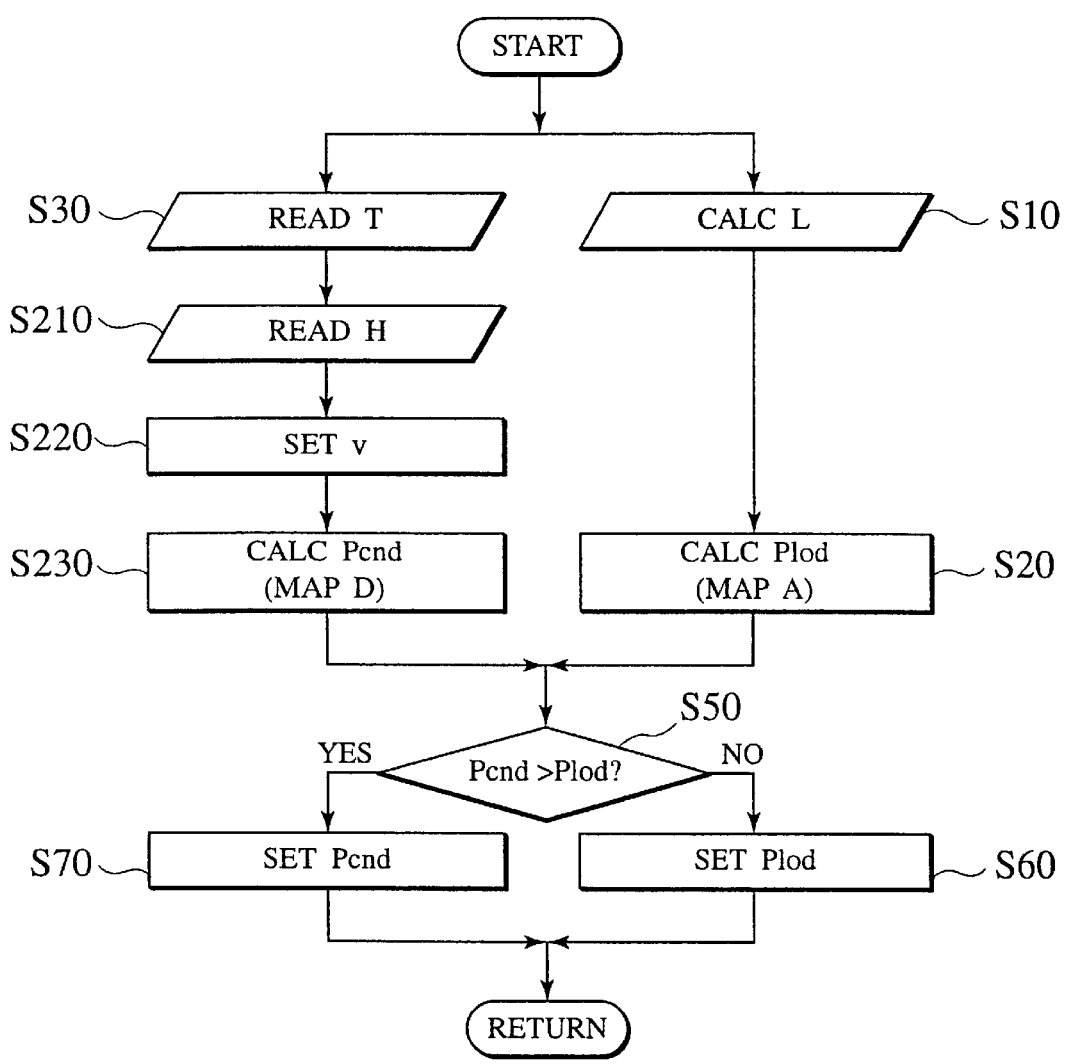
FIG. 8 is a flowchart illustrating the operation of a fuel cell system according to the present embodiment.
Figure 9:
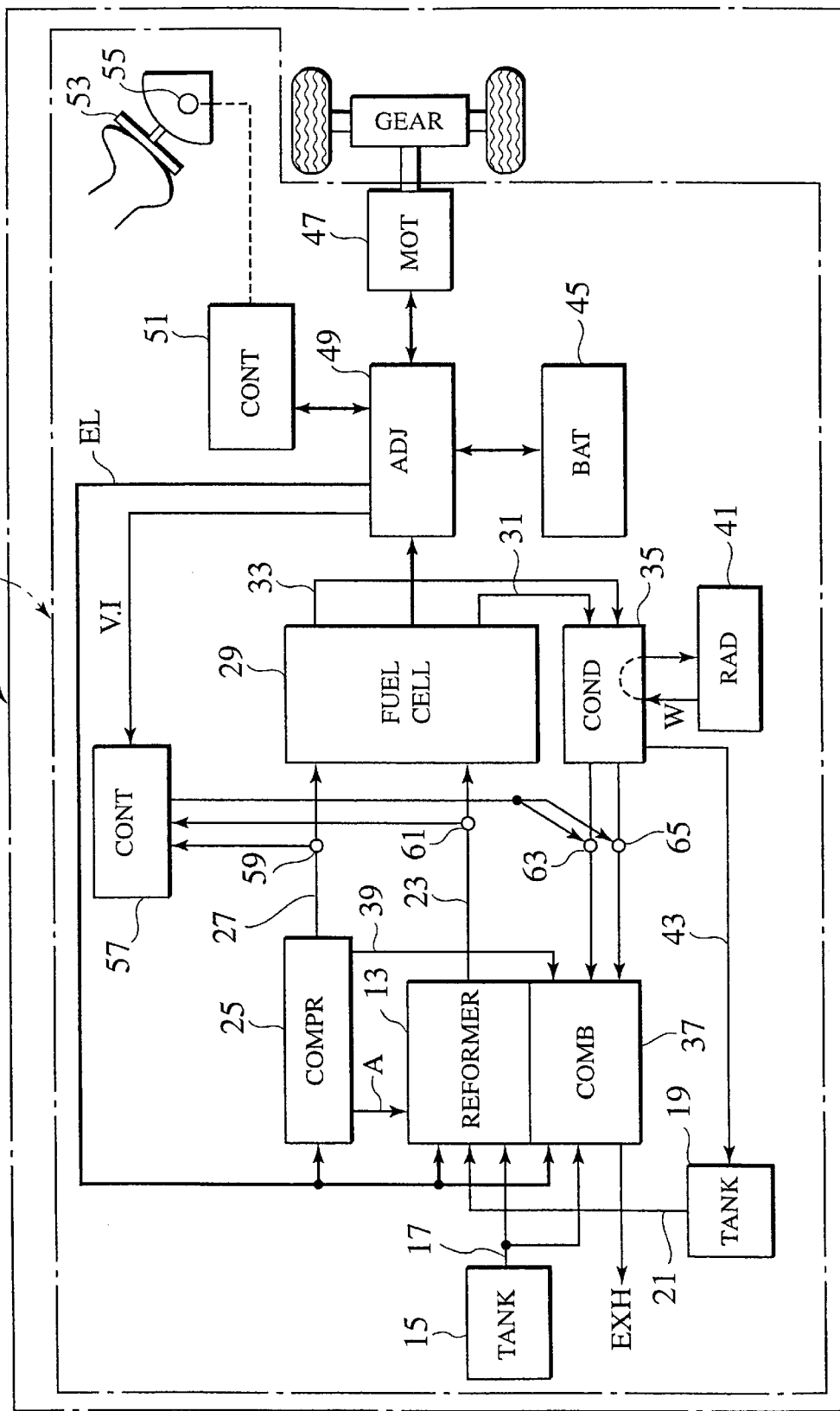
FIG. 9 is a drawing showing the configuration of a fuel cell studied by the present inventor.

The operation of the fuel cell system S2 according to this embodiment is described below, with reference made to the flowchart shown in FIG. 8. Because the control program shown in this flowchart is a partial variation of the control program shown in FIG. 4, corresponding steps have been described only briefly, or omitted entirely from the description to follow.

In the processing of step S30 and thereafter, which is the difference in this embodiment with regard to the first embodiment, at step S30 because the outlet temperature T from the temperature sensor 67 mounted to the outlet of the condenser 35 is read in, at step S210 the water level value H within the water tank 19. is read in from the water level sensor 73 provided within the water tank 19.

Then, at the next step S220, the map C shown in FIG. 6 is referenced, and a water reclamation speed v corresponding to this water level value H is read in, this being set as the current water reclamation speed v.

Then, a the next step S230, the map D shown in FIG. 7 is referenced, a line on map D corresponding to the currently set water reclamation speed v is established, and from this line an equilibrium operating pressure Pcnd corresponding to the outlet temperature T of the condenser 35 when operating is read in.

Thereafter, in the same manner as described for the first embodiment, program flow proceeds to step S50, at which as comparison test is made to determine whether or not the equilibrium operating pressure Pcnd is greater than the maximum efficiency operating pressure Plod. If the equilibrium operating pressure Pcnd is smaller (NO result), flow proceeds to step S60, at which the operating pressure of the fuel cell system S2 is set to the maximum efficiency operating pressure Pcond. If, however, the equilibrium operating pressure Pcnd is greater, flow proceeds to step S70, at which the operating pressure of the fuel cell system S2 is set to the equilibrium operating pressure Pcnd.

After performing the processing of either step S60 or step S70 as described above, return is made to the beginning of the processing.

In the above-described embodiment, in addition to achieving the effect as achieved in the first embodiment, in response to the water level difference from the water level value H in the water tank to the optimum value Hp, the water reclamation speed v within the fuel cell system S2 is calculated and, in response to the exhaust temperature T from the condenser 35 an the water reclamation speed v, the equilibrium operating pressure Pcnd of the fuel cell system S2 at which the water inflow and outflow in the fuel cell system S2 are balanced is calculated, the result being that it is possible to perform improved control, so that the operating pressure of the fuel cell system S2 exceeds the equilibrium operating pressure Pcnd As a result, by the action of the condenser 35, which is at a pressure exceeding the equilibrium operating pressure Pcnd, water is reclaimed from the exhaust, so as to effectively accumulate water in the water tank 19 up to the optimum water level Hp.

Additionally, although the power consumption of the compressor 25 is greater, the greater is the operating pressure, in the case in which the water level H in the water tank 19 is lower than the optimum value Hp, as the water level H approaches the optimum value of Hp, the setting is made so that the equilibrium operating pressure Pcnd becomes smaller, so that it is possible to increase the operating efficiency of the fuel cell system S2.

Although this embodiment of the present invention was described for the example in which the water reclamation speed v is calculated in response to the water level difference between the water level value H in the water tank and the optimum value H, using a linear function as shown in map C, it will be understood, of course, that another type of continuous function can be used. In some cases, it possible to use a discrete function such that takes on a positive value when the water level in the water tank is a prescribed low level value and a negative value when it is a prescribed high level value.

It is further possible to compensate the map D of the second embodiment, similar to the case of the map B in the first embodiment, according to the operating load on the fuel cell system.

The water tank can be one which accumulates a mixed liquid that includes water.

Additionally, although in the foregoing embodiments of the present invention, the outlet temperature of the condenser was used, it will be understood, of course, that it is possible to use, for example, pipe temperature at the outlet of the condenser.

While in the foregoing embodiments the gas containing oxygen is air, in principle this can be another gas that includes oxygen, and it therefore, of course, not limited to air.

While the above-described embodiments use methanol as a fuel, in principle another fuel that contains hydrogen can be used, and of course the fuel is not limited to methanol.

The entire contents of a Patent Application No. TOKUGANHEI 11-196058 with a filing date of Jul. 9, 1999 in Japan are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A fuel cell system, comprising:
   a water tank;
   a reformer obtaining reformed gas by reforming fuel using water from the water tank;
   a fuel cell generating electric power using reformed gas from the reformer and gas that includes oxygen;
   a condenser reclaiming water from exhaust gas from the fuel cell, the exhaust gas reclaimed by the condenser being returned to the water tank;
   an exhaust gas temperature detector detecting temperature of exhaust gas from the condenser; and
   an operating pressure controller controlling the operating pressure of the fuel cell system,
   wherein the operating pressure controller, in response to the temperature of the exhaust gas from the condenser detected by the exhaust gas temperature detector, calculates equilibrium operating pressure of the fuel cell system at which inflow and outflow of the water within the fuel cell system is balanced, in response to operating load on the fuel cell system, calculates maximum efficiency operating pressure at which operating efficiency of the fuel cell system is maximum, and performs control of the operating pressure of the fuel cell system in which higher pressure of the equilibrium operating pressure and the maximum efficiency operating pressure is set as the operating pressure.

2. A fuel cell system according to claim 1, further comprising a combustor combusting the reformed gas included in the exhaust gas of the condenser to obtain heat of combustion, which is used as a heat source for the reformer.

3. A fuel cell system according to claim 1, further comprising a water level detector detecting water level value in the water tank,
   wherein the operating pressure controller, in response to the water level value detected by the water level detector, calculates a water reclamation speed within the fuel cell system.

4. A fuel cell system according to claim 3, wherein the operating pressure controller, in response to the temperature of the exhaust gas of the condenser detected by the exhaust temperature detector and the water reclamation speed within the fuel cell system, calculates the equillibrium operating pressure of the fuel cell system.

5. A fuel cell system according to claim 1, wherein the operating pressure controller, based on the operating load on the fuel cell system, calculates the equilibrium operating pressure of the fuel cell system.

6. A fuel cell system according to claim 1, wherein the exhaust temperature detector detects a temperature of a gas containing oxygen exhausted from the condenser.

7. A fuel cell system according to claim 1, wherein the exhaust gas temperature detector detects temperature of the reformed gas exhausted from the condenser.

8. A fuel cell system according to claim 1, wherein the operating pressure controller, in response to the electric power generated by the fuel cell and the auxiliary equipment electric power, calculates the operating load on the fuel cell system.

9. A fuel cell system according to claim 1, wherein the gas that includes oxygen is air.

10. A fuel cell system according to claim 1, wherein the fuel is methanol.

11. A fuel cell system, comprising:

a water tank;

a reformer obtaining reformed gas by reforming fuel using water from the water tank;

a fuel cell generating electric power using reformed gas from the reformer and gas that includes oxygen;

a condenser reclaiming water from exhaust gas from the fuel cell, the exhaust gas reclaimed by the condenser being returned to the water tank;

an exhaust gas temperature detecting means for detecting temperature of exhaust gas from the condenser; and an operating pressure control means for controlling the operating pressure of the fuel cell system, wherein the operating pressure control means, in response to the temperature of the exhaust gas from the condenser detected by the exhaust gas temperature detecting means, calculates equilibrium operating pressure of the fuel cell system at which inflow and outflow of the water within the fuel cell system is balanced, in response to operating load on the fuel cell system, calculates maximum efficiency operating pressure at which operating efficiency of the fuel cell system is maximum, and performs control of the operating pressure of the fuel cell system in which higher pressure of the equilibrium operating pressure and the maximum efficiency operating pressure is set as the operating pressure.

12. A method for controlling operating pressure of a fuel cell system having a water tank, a reformer obtaining reformed gas by reforming a fuel using water from the water tank, a fuel cell generating electric power using reformed gas from the reformer and a gas that contains oxygen, and a condenser reclaiming water from exhaust gas from the fuel cell and returning the water to the water tank, comprising:

detecting temperature of exhaust gas from the condenser;

calculating, in response to the temperature of the exhaust gas from the condenser, equilibrium operating pressure of the fuel cell at which inflow and outflow of the water within the fuel cell system is balanced;

calculating operating load on the fuel cell system;

calculating, in response to operating load on the fuel cell system, maximum efficiency operating pressure at which operating efficiency of the fuel cell system is maximum; and controlling the operating pressure of the fuel cell system in which higher pressure of the equilibrium operating pressure and the maximum efficiency operating pressure is set as the operating pressure.

13. A fuel cell system according to claim 1, further comprising a valve mechanism adjusting pressure relating to the reformed gas and pressure relating to the gas that includes oxygen, wherein the operating pressure controller performs the control of the operating pressure of the fuel cell system, while controlling the valve mechanism.

14. A fuel cell system according to claim 11, further comprising an adjusting means for adjusting pressure relating to the reformed gas and pressure relating to the gas that includes oxygen, wherein the operating pressure control means performs the control of the operating pressure of the fuel cell system, while controlling the adjusting means.

15. A method for controlling operating pressure of a fuel cell system according to claim 12, further comprising:

controlling a valve mechanism for adjusting pressure relating to the reformed gas and pressure relating to the gas that includes oxygen while controlling the operating pressure of the fuel cell system.

16. A fuel cell system, comprising:

a water tank;

a reformer obtaining reformed gas by reforming fuel using water from the water tank;

a fuel cell generating electric power using reformed gas from the reformer and gas that includes oxygen;

a condenser reclaiming water from exhaust gas from the fuel cell, the exhaust gas reclaimed by the condenser being returned to the water tank;

an exhaust gas temperature detector detecting temperature of exhaust gas from the condenser; and an operating pressure controller controlling the operating pressure of the fuel cell system, wherein the operating pressure controller, in response to the temperature of the exhaust gas from the condenser detected by the exhaust gas temperature detector, calculates a first operating pressure of the fuel cell system, in response to operating load on the fuel cell system, calculates a second operating pressure of the fuel cell system, and performs control of the operating pressure of the fuel cell system in which higher pressure of the first operating pressure and the second operating pressure is set as the operating pressure.

17. A fuel cell system according to claim 16, wherein the first operating pressure is obtained on the basis of a first map relating to the temperature of the exhaust gas, and the second operating pressure is obtained on the basis of a second map relating to the operating load on the fuel cell system.

18. A fuel cell system according to claim 16, further comprising a valve mechanism adjusting pressure relating to the reformed gas and pressure relating to the gas that includes oxygen, wherein the operating pressure controller performs the control of the operating pressure of the fuel cell system, while controlling the valve mechanism.

* * * * *